United States Patent
Brouard

[15] 3,683,323
[45] Aug. 8, 1972

[54] APPARATUS AND METHOD FOR FORMING A SOUND HOLOGRAM

[72] Inventor: Dominique Brouard, Paris 16e, France

[73] Assignee: Compagnie Generale D'Electricite, Paris, France

[22] Filed: June 16, 1970

[21] Appl. No.: 46,671

[30] Foreign Application Priority Data

June 16, 1969 France......................6920012

[52] U.S. Cl..................340/3 R, 73/67.5 H, 340/5 H
[51] Int. Cl................................................G01s 9/66
[58] Field of Search............340/1, 3, 5 H; 73/67.5 H

[56] References Cited

UNITED STATES PATENTS

| | | | |
|---|---|---|---|
| 3,450,225 | 6/1969 | Silverman | 340/5 H |
| 3,533,056 | 10/1970 | Clark | 340/3 |
| 3,559,465 | 2/1971 | Preston, Jr. | 340/5 H |

*Primary Examiner*—Richard A. Farley
*Attorney*—Sughrue, Rothwell, Mion, Zinn & Macpeak

[57] ABSTRACT

A device on board a ship for recording ultrasonic holograms of submerged objects. Ultrasonic waves back-scattered by the heterogeneities of the layer of water neat to the object studied are used as a reference signal. The irregularities of the propagation speed of the waves in the water are thus eliminated.

4 Claims, 2 Drawing Figures

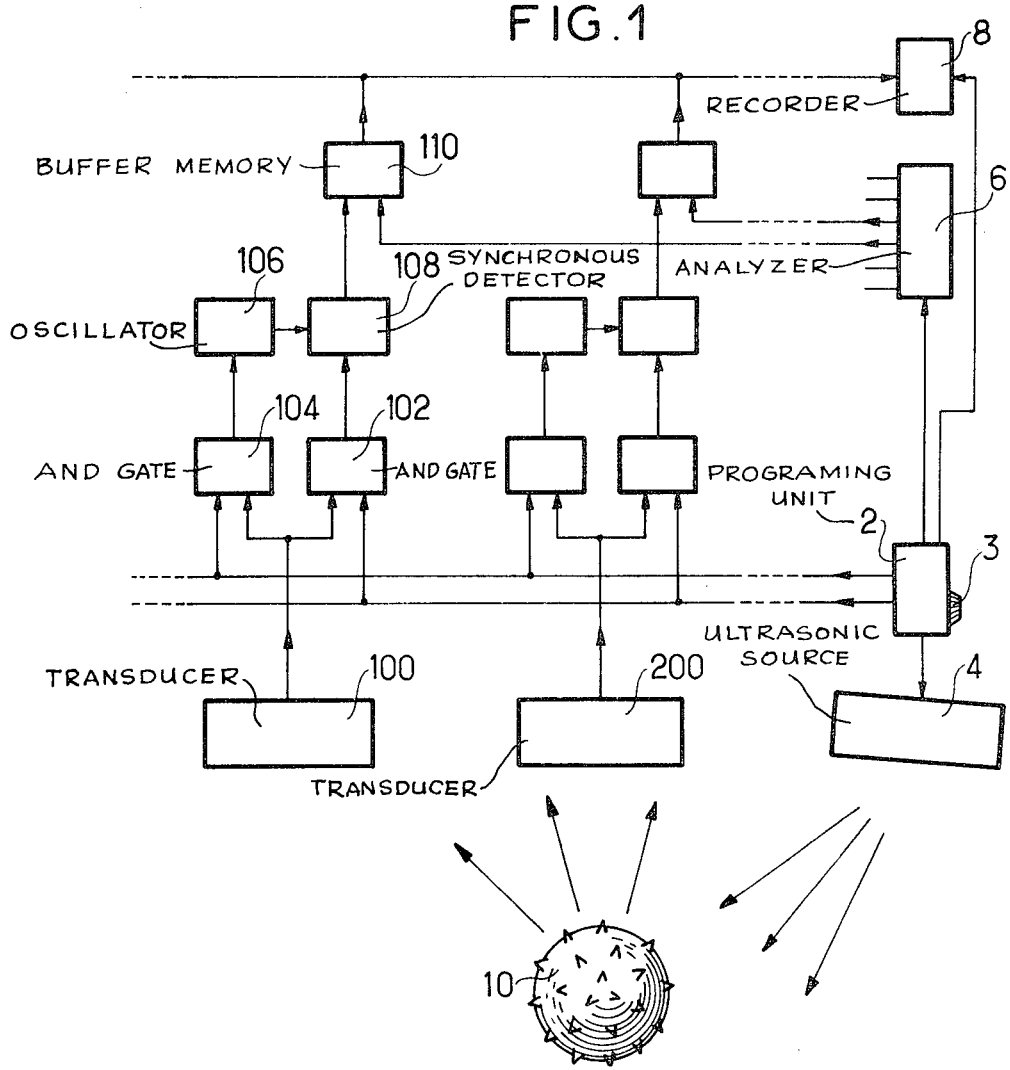
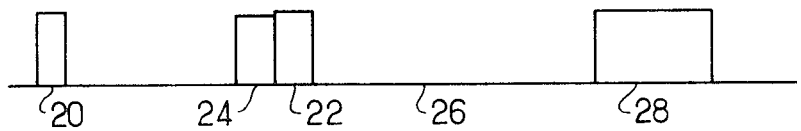

APPARATUS AND METHOD FOR FORMING A SOUND HOLOGRAM

BACKGROUND OF THE INVENTION

The present invention is concerned with the investigation of a beam of sound waves returned by an object receiving a coherent beam of such waves. By sound waves as used herein, there are understood not only those which are capable of being heard by the human ear, but also all those which are of mechanical nature, particularly ultrasonic waves. Although the frequencies of such waves are considerably lower than those of light, one speaks, by analogy with optics, of the "illumination"of an object by an ultrasonic beam emitted by a source, for example, in the same way as one speaks of reflected, diffused, ultrasonic radiations, etc.

It is also known that it is possible to be aware of the shape of an object by illuminating it with a coherent sound beam, which is generally ultrasonic, and by recording a hologram of the radiation reflected back by this object. Such a hologram, just like an optical hologram, is formed by the interference figure created on a detection surface by the beam reflected back by the illuminated object, and by a reference beam, which is coherent and of the same frequency as the illuminating beam. It can be recorded by a matrix of detectors sensitive to the waves reaching the detection surface. These detectors are generally formed by transducers, such as piezoelectric quartz members capable of delivering at any instant an electric signal which is proportional to the sound pressure to which they are subjected. It is also known, starting from such a transducer matrix, to record a sound hologram without using a reference beam. For this purpose, an electric signal synchronized on the source illuminating the object is combined by suitable electronic means with the output signal of each of the transducers. This additional or reference signal is equal to the output signal which would be supplied by the transducer, to the output of which it is applied if the transducer received a real reference beam.

The means which make use of these principles no longer permit the recording of holograms of good quality when heterogeneities of the medium, generally sea water, introduce large phase variations between the signals received by the various transducers.

Furthermore, it is known that when the illuminated object is displaced relatively to the transducer matrix, it is expedient, for avoiding the hologram becoming blurred, to illuminate the object by pulses of short duration (emission pulses), and likewise to record the waves reflected back by this object only during a suitable time interval (defined by a reception pulse). This situation is the most usual in practice if, for example, the hologram recording takes place on board a ship in motion, the possibly detected objects being stationary in the water. The time interval separating the illuminating pulse from the receiving pulse then defines the distance at which the objects are located and of which the holograms are capable of being recorded.

SUMMARY OF THE INVENTION

One object of the present invention is to permit the formation of sound holograms which are as little affected as possible by the heterogeneities in the speed of propagation of sound waves in the traversed medium.

The apparatus and method for forming a sound hologram according to the present invention, which utilize a sound source emitting a coherent illumination beam in the direction of the object being investigated during emission pulses, a matrix of transducers receiving the sound waves reflected back by this object, a programming device capable of supplying a reception pulse a suitable time lapse after each emission pulse, primary opening means each capable of transmitting the output signal of one of the transducers and controlled by the programming device so as to achieve this transmission during the duration of the reception pulses, combination means each receiving the output signal as thus transmitted by one of the primary opening means and combining it with a reference signal, the hologram being formed by all the output signals of these combination means, are characterized by the fact that the apparatus comprises, in addition, auxiliary opening means capable of transmitting the output signal of the aforesaid transducers, these auxiliary opening means being controlled by the programming device so as to obtain this transmission during the period of pre-reception pulses, these latter being provided by the programming device and preceding the reception pulses, phase memories each receiving the signal thus transmitted by one of the auxiliary opening means and being capable of memorizing the phase of this signal, these phase memories providing the aforesaid reference signals to the aforesaid combination means.

BRIEF DESCRIPTION OF THE DRAWINGS

One example of how the present invention is carried into effect will now be described by reference to FIGS. 1 and 2 of the drawings. This example is concerned with detecting from a ship stationary objects which are immersed in the water.

FIG. 1 represents a block diagram of apparatus according to the present invention on board the ship; and FIG. 2 represents the succession in time of the various phases in the functioning of the apparatus of the present invention.

DESCRIPTION OF THE PREFERRED EMBODIMENT

A programming unit 2, of any suitable type, defining the functioning periods of the various elements of the apparatus can be seen in FIG. 1. This programming unit is fitted with a control button 3. It controls first of all, by the sending of emission pulses, an ultrasonic source 4 which transmits ultrasonic waves with a frequency of 250 kc/s in the direction of the object 10 to be investigated. Transducers 100 and 200, of any suitable type, which are capable of transforming into an electric signal the ultrasonic waves which reach them, can also be seen in FIG. 1. These transducers can, for example, be of the piezoelectric type, and their individual dimensions are of the order of half of the length of the ultrasonic waves. They form a rectangular matrix comprising 100 transducers on each of the sides of the rectangle, that is to say, altogether 10,000 transducers, of which only two are shown in FIG. 1.

Each of these transducers is followed by a chain of electronic elements, the said chain being composed in the same manner for all. This is the reason why it is now to be described by reference only to the transducer 100. The output signal from this transducer 100 is applied to two electronic gates 102 and 104 of the AND type, which can be opened from two separate output channels of the programming unit 2. The output signal of the gate 104 is applied to an oscillator 106. This oscillator is capable of acting as a phase memory, that is to say, when it receives an alternating signal, of which the frequency corresponds to its true frequency, which is equal in the example described to that of the waves emitted by the source 4 but could be a multiple thereof, for example, it is caused to oscillate in synchronism with this alternating signal. When the input signal has disappeared, it continues to oscillate. It comprises a resonant circuit with a high overvoltage coefficient, so that the frequency of its oscillation is predetermined with precision. This amounts to saying that it retains in the memory the phase of the input signal which has been applied to it. The output signal of the gate 102 forms the input signal of a synchronous detector 108, which in addition receives the output signal of the oscillator 106 acting as carrier. The output signal of the synchronous detector 108 is then proportional to the amplitude of the output signal of the gate 102 and to the cosine, for example, of the phase-shift angle between this last output signal and the output signal of the oscillator 106. The output signal of the detector 108 is recorded in a buffer memory 110 which is moreover controlled from one of the output terminals of an analyzer 6, of any suitable construction, which comprises as many such terminals as there are transducers, such as 100, and buffer memories, such as 110. When the reading of the buffer memory 110 is controlled by the analyzer 6, the signal recorded in this memory is erased and recorded in a common recorder 8, which can be of any suitable type and which has no bearing on the present invention. It may comprise, for example, an electronic scanning tube, in which the transparency of a plate is made proportional to the signal recorded in the buffer memory 110 at a point corresponding on this plate to the position of the transducer 100 in the transducer matrix.

It is known that the illumination of such a plate by means of a suitable beam of coherent light makes possible, provided the transparency of this plate represents a hologram, the production of an image of the object which has caused the formation of this hologram.

By means of FIG. 2, there will now be described the operation of the apparatus: this operation is periodic and it is controlled by the programming unit 2. The unit 2 first of all delivers an emission pulse, the length of which is of the order of 100 microseconds and is represented at 20. This emission pulse is applied to the source 4, and it causes the illumination of the object 10 by the ultrasonic waves originating from this source.

The waves reflected back by the object 10 are received by the transducers, such as 100, after a travel time in the water which depends on the distance at which the object 10 is situated in relation to the ship.

This is why the programming unit 2 delivers a reception pulse 22 of a duration shorter than 1 ms after a time lapse which can be adjustable from 10 to 120 ms by means of the button 3 and depending on the distance at which it is desired to detect objects such as 10. Consequently, only the objects disposed at this distance are detected. The spacing between the maximum distance and the minimum distance at which an object can be detected for a given adjustment of the programming unit 2, that is to say, for a given time interval between the emission pulse and the reception pulse, is proportional to the duration of the reception pulse. This duration can be made as long as would be desired, because of the relative displacement of the object in relation to the ship. This reception pulse causes the opening of the gate 102 and the transmission of the output signal from the transducer 100 towards the synchronous detector 108.

According to the present invention, the programming unit 2 delivers, just before the reception pulse 22, a pre-reception pulse 24 of a length equal, for example, to that of the pulse 22 and which is applied to the gates, such as 104. The oscillator 106 then receives the output signal from the transducer 100 just before this transducer receives the ultrasonic waves reflected by the object 10.

The oscillator 106 is thus synchronized on the ultrasonic waves returned by the section of water close to the object 10 and situated between this object and the ship. It is in fact known that the water of oceans, for example, has heterogeneities capable of causing the retro-diffusion of the ultrasonic waves.

It is evident that the power thus retro-diffused is much weaker than that which can be returned by a solid object of large dimensions relatively to the ultrasonic wave length. However, this power is nevertheless sufficient to permit the synchronization of the oscillator 106.

During the duration of the reception pulse 22, it is the output signal of the oscillator 106 which serves as reference signal for the formation of the hologram recorded on the buffer memories, such as 110. The reference signal thus undergoes the same phase variations, caused by the variations in speed of propagation in the water, as the signal coming from the object. The influence of these variations is thus minimized. Furthermore, the small possible variations in frequency of the source are found in like manner in the signal coming from the object and the reference signal, whatever may be the distance of this object.

Following the reception pulse 22, an analysis period 26 commences. The start of this period is materialized by a pulse sent by the programming unit 2 towards the analyzer 6 which comprises an electronic clock providing a train of analysis pulses of high recurrence frequency. These pulses are sent successively by means of shift registers to the buffer memories such as 110 and cause the transfer of the data contained in these memories towards the recorder 8. After the analysis period, a reading period 28 takes place from the recorder 8, by means of a control pulse sent by the programming unit 3 to the said recorder.

It is obvious that the invention is not in any way limited to the example illustrated and described, it obviously being possible for the various means employed to be replaced by any equivalent means.

In particular, it is possible to use a single oscillator, such as 106, preceded by a single gate, such as 104, for a group of several transducers, such as 100. The reference signal combined with the output signals of the transducers of this group is then the mean of the reference signals which are combined with these output signals in the example described above.

I claim:

1. In apparatus for forming a sound hologram, comprising:

a sound source which emits, during emission pulses, a coherent light beam in the direction of the object being investigated, a matrix of transducers receiving the sound waves returned by this object, a programming unit capable of supplying a reception pulse a suitable time interval after each emission pulse, primary opening means for transmitting the output signals from these transducers and controlled by said programming unit so as to achieve this transmission during the period of said reception pulses, and combination means each receiving the output signal thus transmitted by one of said opening means and combining it with a reference signal, the hologram being formed by all the output signals of these combination means; the improvement comprising auxiliary opening means capable of transmitting the output signals of said transducers, said auxiliary opening means being controlled by said programming unit so as to achieve this transmission during the duration of pre-reception pulses supplied by said programming unit and preceding said reception pulses, phase memories each receiving the signal thus transmitted by one of said auxiliary opening means and being capable of preserving the phase of this signal in a memory, these phase memories supplying the aforesaid reference signals to said combination means.

2. Apparatus according to claim 1, in which one of said phase memories receives the output signals of a group of said transducers by means of one of said auxiliary opening means, the output signal of this memory being applied simultaneously to said combination means which receive the output signal of one of the transducers of said group.

3. Apparatus according to claim 1, in which said programming unit is arranged in such a manner that the said pre-reception pulses are of a duration substantially equal to that of the said reception pulses, and immediately precede them.

4. In a process for forming a sound hologram, wherein the object being investigated is illuminated by sound waves for the duration of at least one emission pulse, the sound waves returned by this object are received on a matrix of transducers, and the output signals of these transducers are combined with a reference signal of like frequency for the duration of reception pulses subsequent to the said emission pulses; the improvement comprising generating several of said reference signals for combining them with the output signals of several transducer groups comprising at least one of said transducers, each reference signal being derived from the signals present at the output of the transducers of one of said groups during the duration of pre-reception pulses preceding the said reception pulses and subsequent to the said emission pulses and each reference signal being memorized and later combined with the output signals of the transducers of its respective group.

* * * * *